United States Patent [19]

Cripe et al.

[11] Patent Number: 4,817,537
[45] Date of Patent: Apr. 4, 1989

[54] CONTAINER CARRYING CONVERTIBLE RAIL-HIGHWAY VEHICLE

[76] Inventors: Alan R. Cripe, 4511 Menokin Rd., Richmond, Va. 23225; Christopher A. Cripe, 1903 Escourt Dr., Coatesville, Pa. 19320

[21] Appl. No.: 26,463

[22] Filed: Mar. 16, 1987

[51] Int. Cl.4 ............................................. B61D 17/10
[52] U.S. Cl. .................... 105/404; 296/182; 280/DIG. 8; 105/416; 105/418; 105/419; 105/421; 105/4.1; 410/94; 410/77
[58] Field of Search .......................... 410/53, 82, 52, 89, 410/90, 121, 129, 155, 54, 56, 3, 44, 57, 66, 77, 94; 105/215.1, 215.2, 416, 4.2, 4.3, 4.1, 404, 413, 414–418, 419–421; 280/80 B, 423 R, DIG. 8; 296/182

[56] References Cited

U.S. PATENT DOCUMENTS

| | | | |
|---|---|---|---|
| 2,709,969 | 6/1955 | Andert | 410/53 |
| 3,043,628 | 7/1962 | Hockensmith, Jr. | 280/423 R X |
| 3,085,707 | 4/1963 | Tantlinger | 280/DIG. 8 |
| 3,527,171 | 9/1970 | Stark | 105/416 X |
| 3,616,764 | 11/1971 | Johnson et al. | 105/414 X |
| 3,717,372 | 2/1973 | Carr | 410/82 |
| 3,762,340 | 10/1973 | Udaloff | 410/94 |
| 3,995,564 | 12/1976 | Cordani | 105/418 |
| 4,132,326 | 1/1979 | Pinto | 280/423 R X |
| 4,266,820 | 5/1981 | Whaley et al. | 410/82 X |
| 4,381,713 | 5/1983 | Cripe | 410/53 X |
| 4,624,188 | 11/1986 | Kaleta | 410/52 X |

Primary Examiner—Robert B. Reeves
Assistant Examiner—Frank H. Williams, Jr.
Attorney, Agent, or Firm—Staas & Halsey

[57] ABSTRACT

A container carrying rail-highway vehicle in the form of a semitrailer chassis including an elongated center sill box extending longitudinally of the vehicle, a front box-type transverse sill attached to a forward portion of the center sill and a rear box-type transverse sill attached to a rearward portion of the center sill member. Two side beams are further provided and are attached at each end thereof to the front sill and rear sill, respectively, on either side of the center sill. The side beams are disposed from a generally higher position in the front of the vehicle to a lower level at the rear of the vehicle and are further attached to the center sill by a plurality of transverse outrigger members which extend between the center sill and each of the side beams. The vehicle is further provided with at least a pair of retractable highway wheels on a rearward lower surface of the trailer, a coupling device for coupling the trailer to a next adjacent trailer and a coupling device for coupling the trailer to a separable rail bogie on a rear undersurface of the vehicle. The center sill of the semitrailer body has a gooseneck, fish belly configuration which in combination with the side beams provides high bending stability in the gooseneck area of the center sill so that high compression and tension loads can be taken through the center sill.

2 Claims, 5 Drawing Sheets

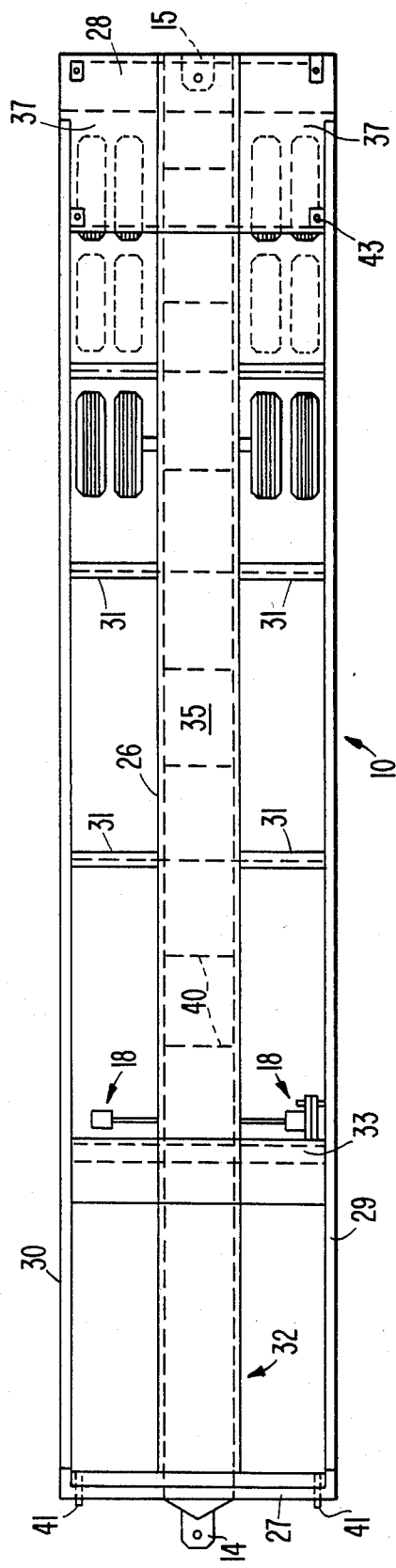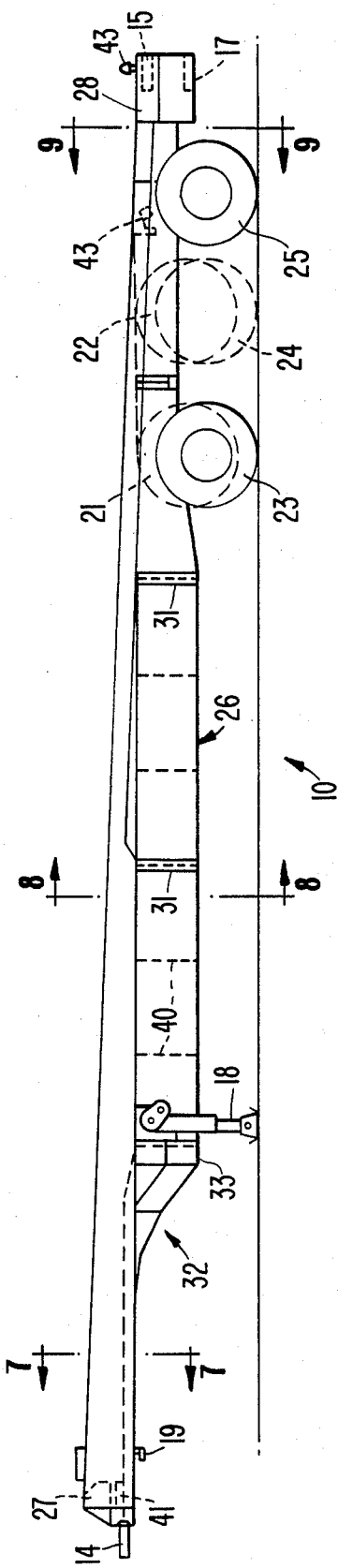

CONTAINER CARRYING CONVERTIBLE RAIL-HIGHWAY VEHICLE

BACKGROUND OF THE INVENTION

The present invention relates to container carrying vehicles and, more particularly, to a convertible rail-highway container carrying vehicle which can accommodate a standard ISO (International Standards Organization) tunnel type 40 foot container which is 9'-6" high.

Container carrying railway vehicles are well known and are derived from flat cars of various types with the addition of appropriate hardware to secure the container to the car structure.

Also container carrying highway vehicles such as semitrailer container chassis are widely used for container shipping on highways.

A container mounted on a flat car must be transferred to a highway container chassis in order to reach its final destination, causing delays and extra costs to be incurred. In addition, as the delivery distance increases, all highway transport becomes increasingly uneconomical.

Further, it has been found that high cube containers are more desirable for shipping most commodities and are in high demand by shippers. The largest standard containers which may be legally operated on highways are 9'-6" high and require a tunnel type container configuration. This requires a "gooseneck" chassis design which allows the front of the chassis at the king pin area to nest inside the tunnel recess in the center underfloor of the front of the container.

For economic and service reasons it is desirable to minimize or eliminate costly and time consuming operations employing separate rail and highway container carrying vehicles.

It is also desirable for economic reasons to operate long trains of lightweight construction. However, the structural strength requirements for rail-highway container carrying vehicles must be on the order of 400,000 pounds or more, thus precluding the use of standard type highway designs for container chassis or gooseneck chassis.

Further it has been found that rail-highway container vehicles capable of carrying 9'-6" containers have not been developed which possess the requisite strength to operate in long trains or meet the overall highway height requirement of 13'-6".

It would therefore be desirable to provide a single lightweight vehicle that can be used for both rail and highway operations while carrying maximum height cargo containers without removing the container from the vehicle.

SUMMARY OF THE INVENTION

The present invention provides a lightweight convertible rail-highway vehicle for carrying standard cargo containers of the "ISO" type or similar that are 9'-6" high and are of the "tunnel" type. The vehicle has the requisite structural strength to operate anywhere in a long train of similar vehicles and when operating in highway mode does not exceed the maximum permitted height of 13'-6". The vehicle configuration further provides for full opening of the container body end doors without structural interference.

The foregoing objects are realized by providing a container carrying rail-highway vehicle comprising a semitrailer chassis and vehicle structure comprising a longitudinal center sill box structure of varying cross section, a front transverse box structure attached to the forward necked-down portion of the center sill, a rear box type transverse sill attached to the rearward portion of the center sill, and two side beams attached at each end to the front and rear sill respectively on either side of the center sill in a position allowing the cargo container to nest inside the side beams. The side beams are disposed from a higher position at the front to the main deck level at the rear of the vehicle and a plurality of transverse outrigger members extend between the center sill and each of the side beams. The higher position of the side beams at the front of the vehicle provides for tractor king pin clearance. The vehicle further includes at least a pair of retractable highway wheels which may be positioned on a lower surface of the center sill; a coupling device at each end of the vehicle for coupling to a next adjacent vehicle when in rail mode; and a coupling device for coupling the vehicle to a separate rail bogie at a point under the center of the rear sill.

BRIEF DESCRIPTION OF THE DRAWINGS

Other objects, features and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of the specification, wherein like reference numerals designate corresponding parts in the various figures, wherein:

FIG. 3 is a top plan view of the container carrying rail-highway vehicle;

FIG. 4 is a side elevational view of the vehicle of FIG. 3;

DETAILED DESCRIPTION OF THE PRESENTLY PREFERRED EXEMPLARY EMBODIMENTS

Figure 1:
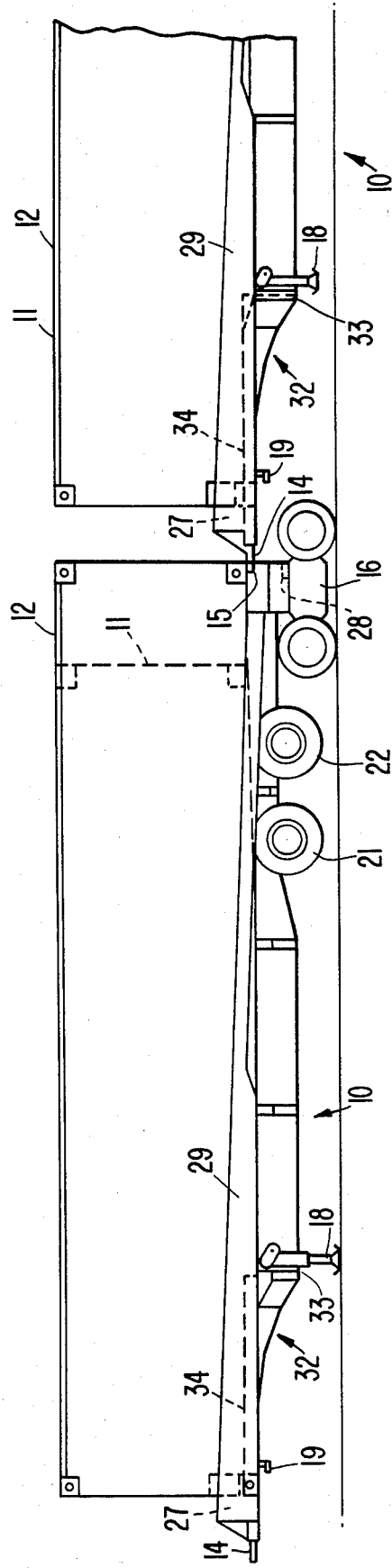
FIG. 1 is a side elevational view of two container carrying convertible rail-highway vehicles formed in accordance with the present invention coupled end to end for operation in rail mode.
Figure 2:
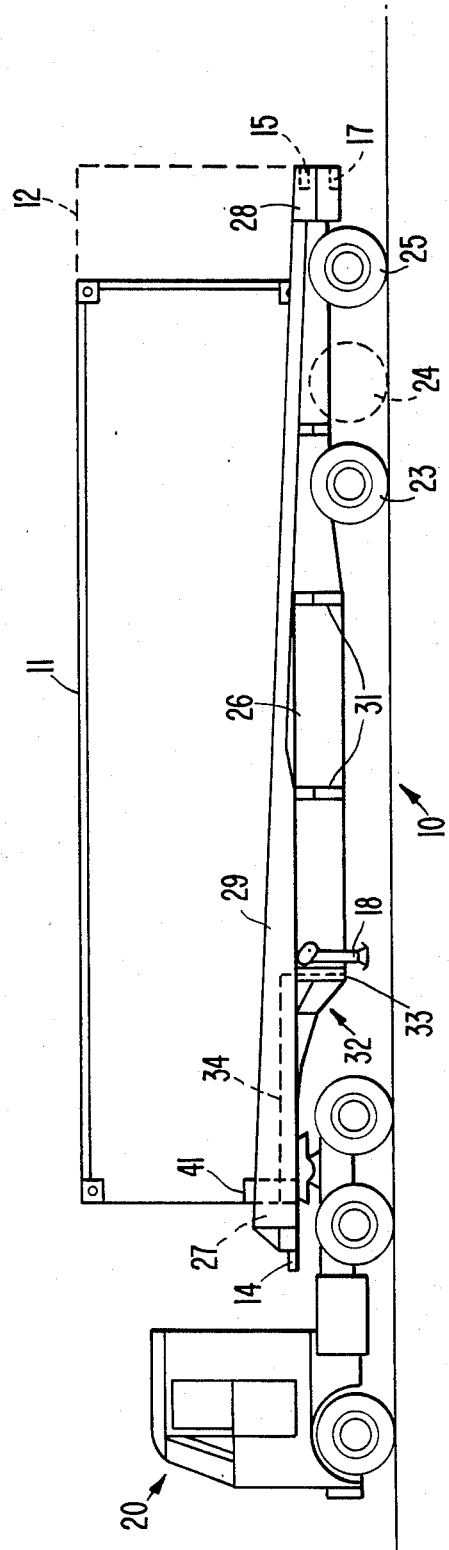
FIG. 2 is a side elevational view of one container carrying rail-highway vehicle formed in accordance with the present invention coupled to a highway tractor for operation in highway mode.
Figure 5:
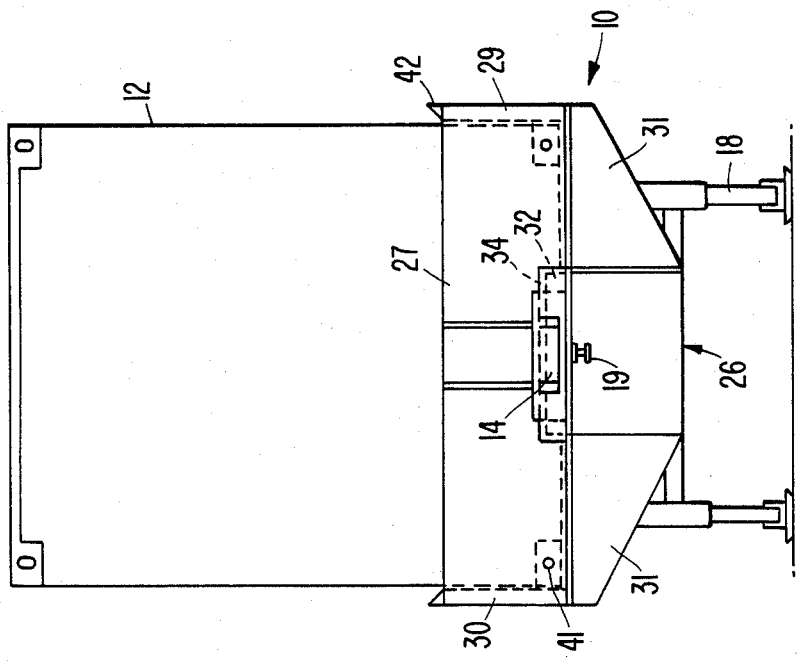
FIG. 5 is a front elevational view of the vehicle of FIG. 3.
Figure 6:
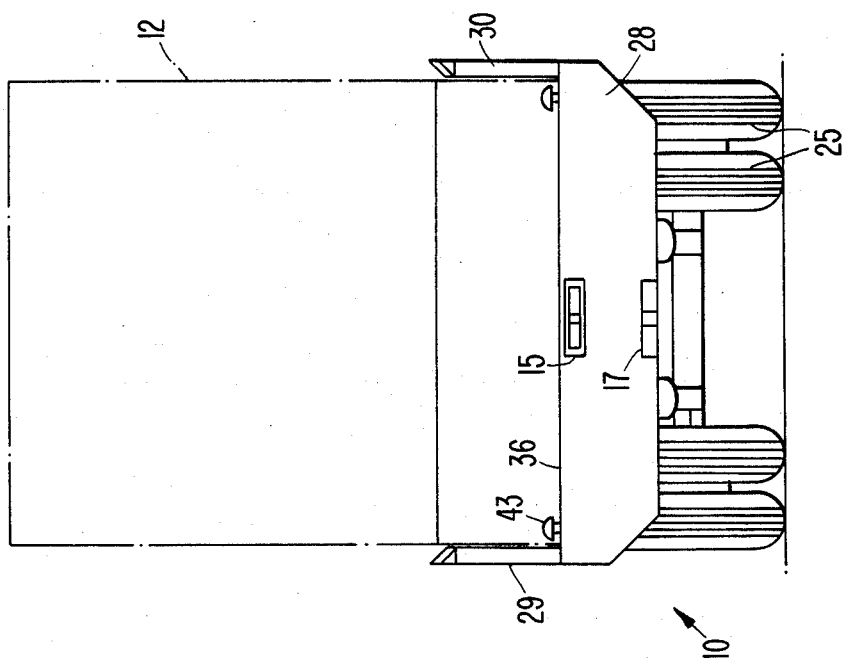
FIG. 6 is a rear elevational view of the vehicle of FIG. 3.

Referring to FIG. 1 two convertible rail-highway container carrying vehicles 10 are shown in rail mode, each carrying a container 11 or 12. More particularly, each vehicle has a front coupler 14 and a rear coupler 15 which when coupled together provide an articulated connection supporting the weight of the trailing vehicle. For rail mode only a detachable rail bogie 16 provides the suspension and braking functions. Bogie 16 is rotatably attached to the vehicle 10 with a suitable locking device at 17.

A landing gear 18 is attached toward the forward end of the vehicle and a standard highway trailer king pin 19 is provided to permit highway and transfer operations with a highway tractor 20. Highway wheel set which are retractable are provided near the rear of the vehicle for rail mode operation and shown retracted as 21 and 22. The forwardmost wheelset, when used for highway operation, lowers to a ground engaging position 23. The rearmost highway wheelset also lowers to a ground engaging position 24, and may be used in that position or moved rearward to a more rearward position 25 for higher load carrying capability.

The vehicle structure can best be seen in FIGS. 3 through 9. A center sill box structure 26 of varying cross section runs the entire length of the vehicle and is rigidly attached to front transverse box sill 27, and a rear transverse box sill 28. Straddling the container on either side are the first and second side beams 29 and 30 which run outside of the container 11 or 12 and are generally disposed from a higher position where attached to the front sill beam 27 to a lower level substantially even with the top of the rear box sill 28. A number of transverse outrigger members or cross members 31 are provided between the side beams 29 and 30 and the center sill 26 to stabilize the side beams. At the front portion of the center sill 26 the sill is reduced in section in a "gooseneck" configuration 32 so that a standard king pin 19 can be provided at the requisite height. At the transition a large box section crossbearer 33 is provided to carry the center sill beam bending loads into the side beams 29 and 30.

At the gooseneck the center sill beam rises about $4\frac{3}{4}$ inches and fits into a cavity or "tunnel" in the underside of the container approximately 40 inches wide by 124 inches long, as shown at 34. The gooseneck top surface 32 of the center sill extends from the front transverse sill 27 about 120 inches rearward tapering at the rearward end to the crossbearer 33. At the rear of the crossbearer 33 the landing gear 18 is attached.

The first and second side beams 29 and 30 are preferably constructed so that the forward portion has a greater section modulus than the rearward portion aft of the first outrigger 31. The aforedescribed structure provides high bending stability in the gooseneck are due to the deep side beams 29,30 so that high tension and compression forces may be taken through the couplers 14, 15 and the vehicle structure 10. More particularly, due to the configuration and flexibility of the end structure only about 25% of the compression and tension loads will be carried through the side beams and 75% will be carried through the center sill 26.

Figure 7:
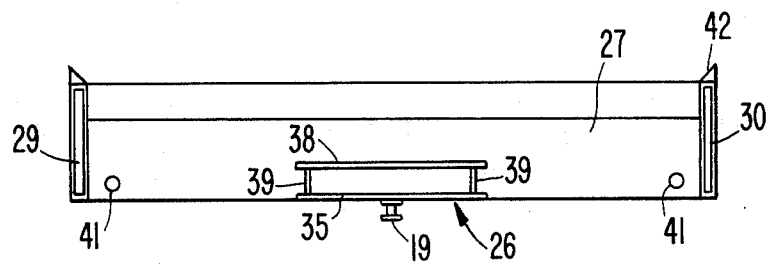
FIG. 7 is a sectional view taken along line 7—7 of FIG. 4.
Figure 8:
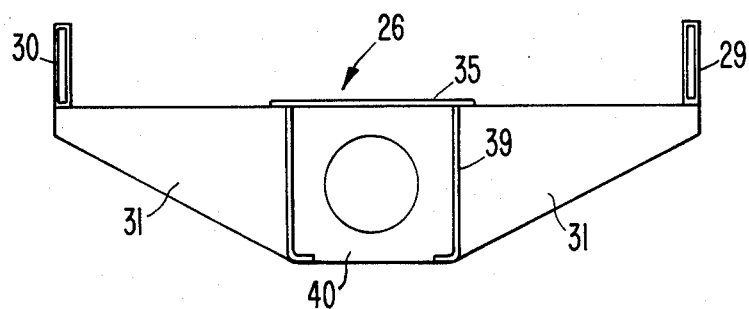
FIG. 8 is a sectional view of the vehicle taken along line 8—8 of FIG. 4.
Figure 9:
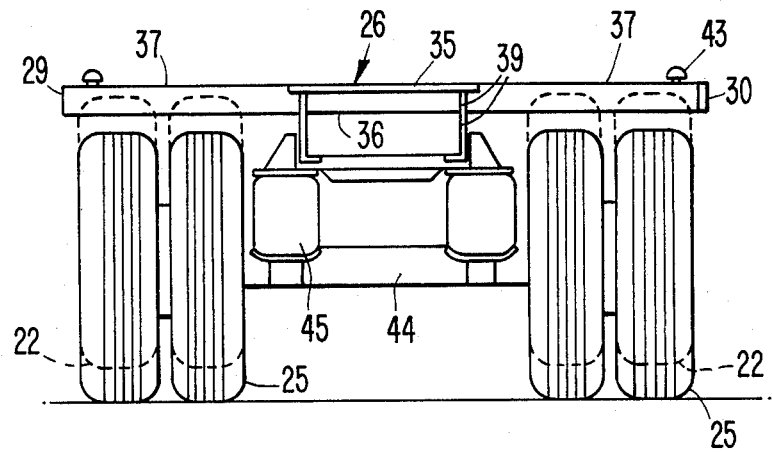
FIG. 9 is a sectional view of the vehicle taken along line 9—9 of FIG. 4.
Figure 10:
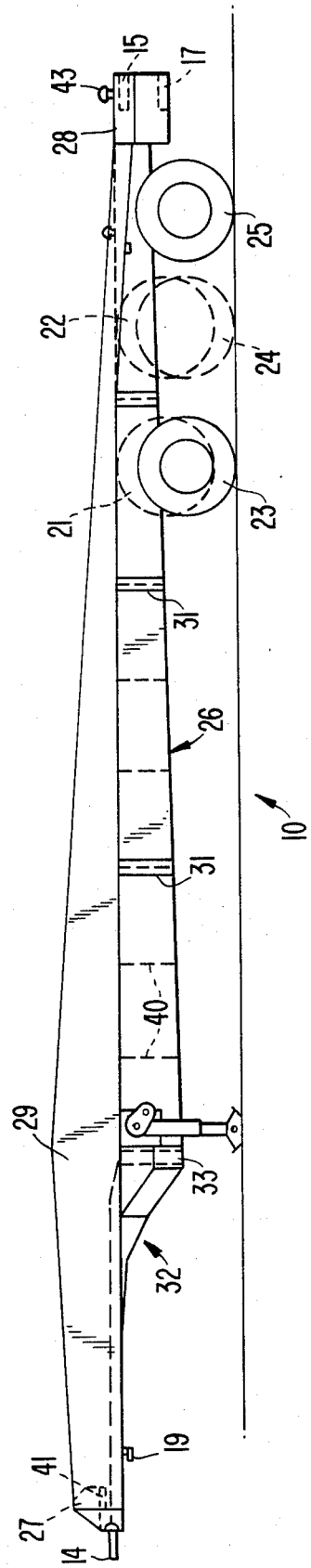
FIG. 10 is a side elevational view of a second embodiment of the container carrying rail highway vehicle, shown in highway mode.

FIGS. 7, 8, and 9 show sections through the structure 10 taken along lines 7—7, 8—8 and 9—9, respectively. Center sill box structure 26 is composed of a main longitudinal plate member 35 which extends from the front face of front transverse box sill 27 to the rear face of rear transverse box sill 28. Plate 35 is the lower face of box center sill 26 at the forward end of the vehicle, as shown in FIG. 7, and, rearward of the gooseneck section 32, plate 35 becomes the top surface of center sill 26, as shown in FIG. 8. At the rear of the vehicle, top center sill plate 35 is coplanar with the top surface of rear transverse box sill 28. Rear coupler 15 is mounted under plate 35 and above shear plate 36 inside box sill 28. Deck plates 37 provide a surface for mounting retractible container twist-lock attachment fittings 43 for both 40 foot and 45 foot long containers.

At the front of front sill 27, front coupler 14 is attached between plate 35 and top plate 38 of the gooseneck section. Suitable side webs 39 and internal stiffeners of various sizes 40 complete the center sill structure. Means for securing the container to the vehicle at front sill 27 are provided by spring loaded horizontal pins 41. Further, angled guide blocks 42 are provided at two locations to assist in loading a container being lowered onto the vehicle.

Since ISO type cargo containers are self supporting between corner castings, the bending moments imparted to the structure are negligible in the highway mode and while higher for the rail mode, they are not particularly significant. The rail mode bending moments combined with dynamic bending and high compression or tension forces requires high strength of the type structure described. Of particular importance is the need to maintain the neutral axis of the gross section modulus of the structure 10 as close as possible to an imaginary line 44 running between the centerline of the front and rear couplers. With the composite structure of the center sill and side beams tied together and with proper section properties, it is possible to provide a satisfactory solution to this problem whereby the structure is light in weight and adequately strong for use in long trains.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A convertible rail-highway vehicle having a gooseneck chassis for carrying containers comprising:

an elongated center sill member extending longitudinally the entire length of the vehicle and having a varying cross section along its length with a rearward portion, a transition portion and a forward portion with a gooseneck of reduced section at said forward portion which has a top surface and a lower face and said transition portion located between said gooseneck and the remainder of said center sill member;

a front coupler at one end o said chassis;

a rear coupler at the end of said chassis opposite from said front coupler;

a front transverse sill member attached to said forward portion of said center sill member;

a rear transverse sill member attached to said rearward portion of said center sill member;

first and second elongated side beam elements mounted at a forward end thereof to said front sill member and a rearward end thereof to said rear sill member with said forward end of said side beam elements being deep with a greater section modulus as compared to said rearward end and spaced on opposite sides of said center sill member at a distance to straddle and run outside of and to nest said container with the front of said side beam elements being disposed at a higher level than said center sill member at said forward end with said greater section modulus and deep side beam elements providing high bending stability in the gooseneck so as to take the high tension and compression forces through said couplers when said vehicle is used as part of a train;

transverse members extending between said center sill member and each of said side beam elements; and said center sill member includes a longitudinal plate having a top surface which extends from said front transverse sill member to said rear transverse sill member with said plate being the lower face member of said center sill at the forward end and rearward of said gooseneck section becomes the top surface of said center sill and extends rearwardly to be coplanar with the top surface of said rear transverse sill.

2. The convertible rail-highway vehicle of claim 1 wherein said center sill member is subject to bending loads when said vehicle is used as part of a train and which includes a large section crossbearer, located at said transition portion of said center sill member connecting it to said side beam elements to carry the center sill member bending loads into said side beams.

* * * * *